Figure 1:
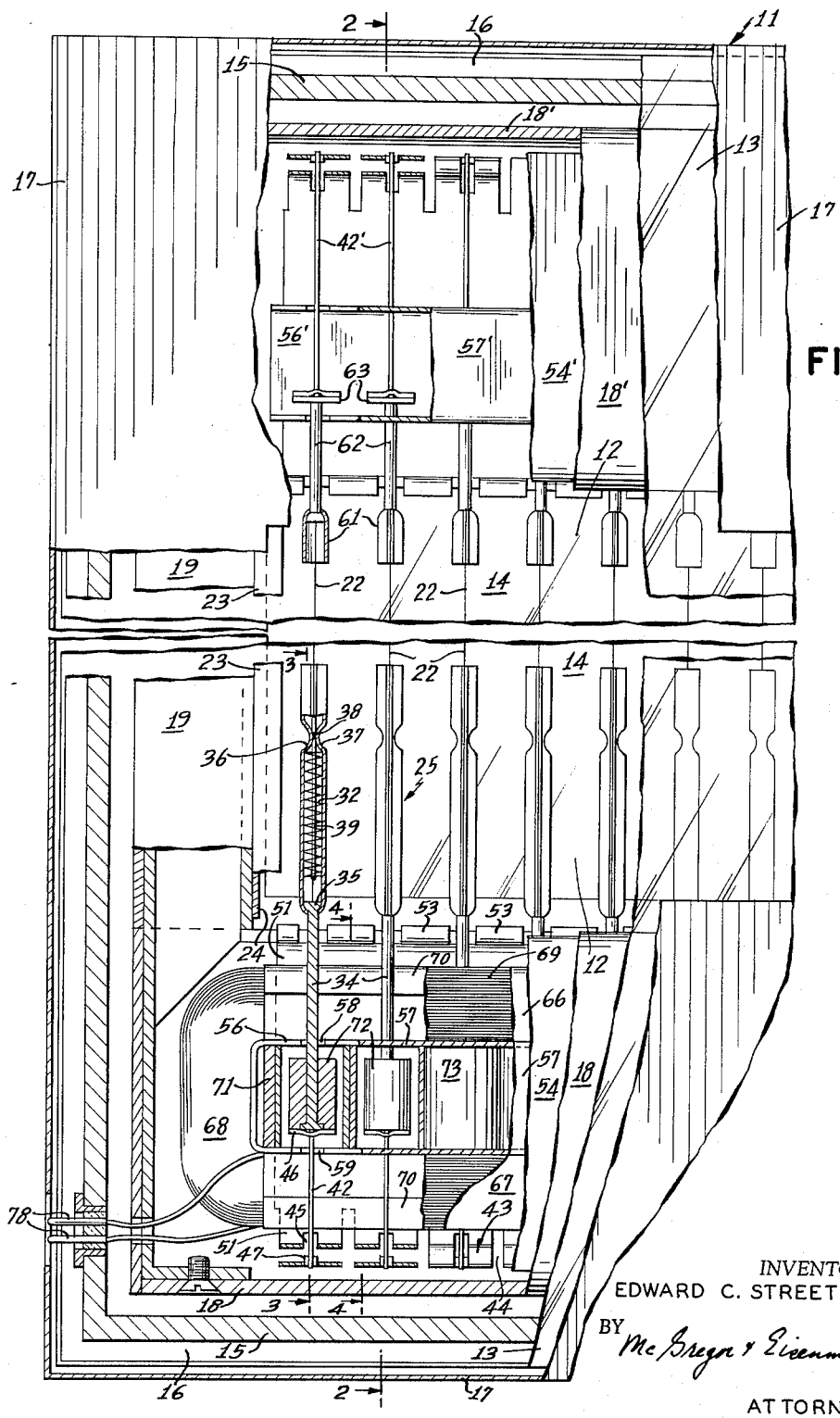

Oct. 12, 1965 E. C. STREETER, JR 3,211,264
ELECTRICALLY CONTROLLED FRICTIONLESS SLAT-TYPE SCREEN
Filed June 22, 1962 2 Sheets-Sheet 1

INVENTOR.
EDWARD C. STREETER, JR
BY McGregor & Eisenman
ATTORNEYS

Oct. 12, 1965    E. C. STREETER, JR    3,211,264
ELECTRICALLY CONTROLLED FRICTIONLESS SLAT-TYPE SCREEN
Filed June 22, 1962    2 Sheets-Sheet 2
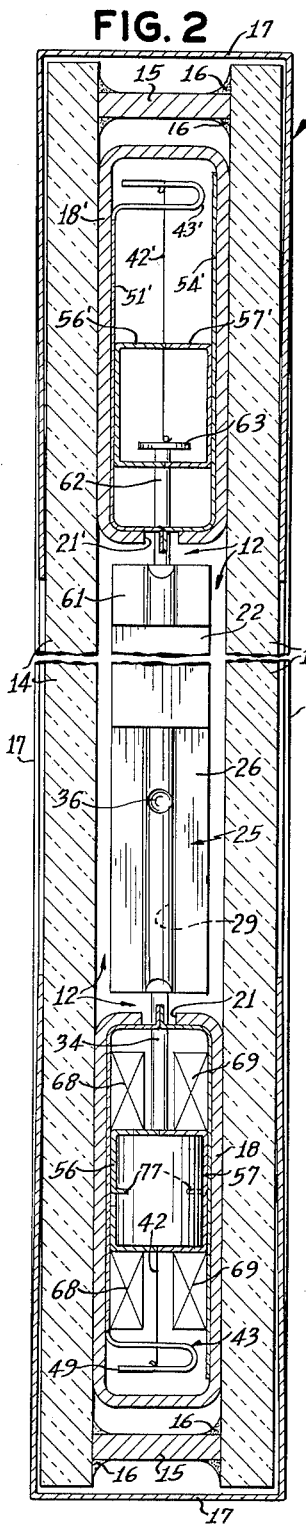
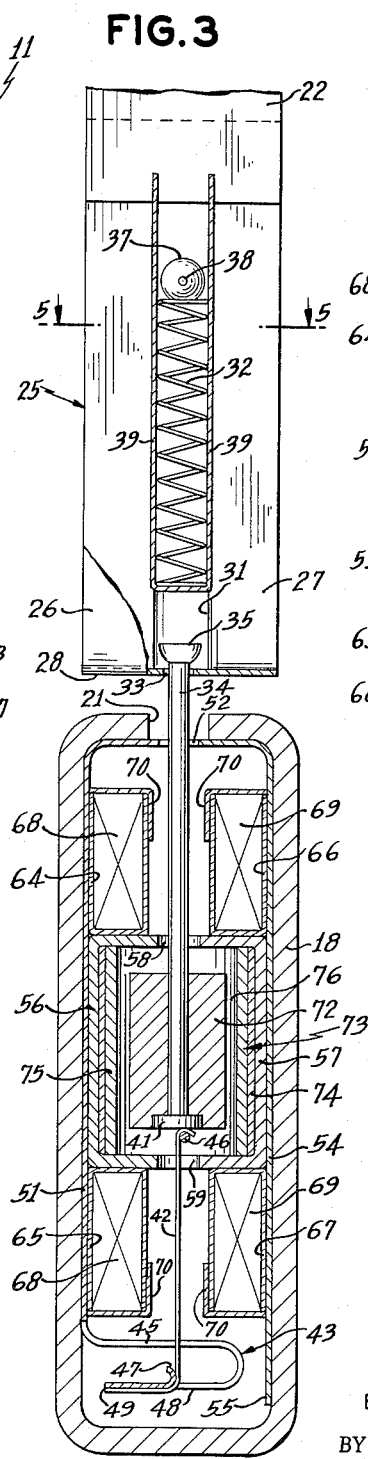
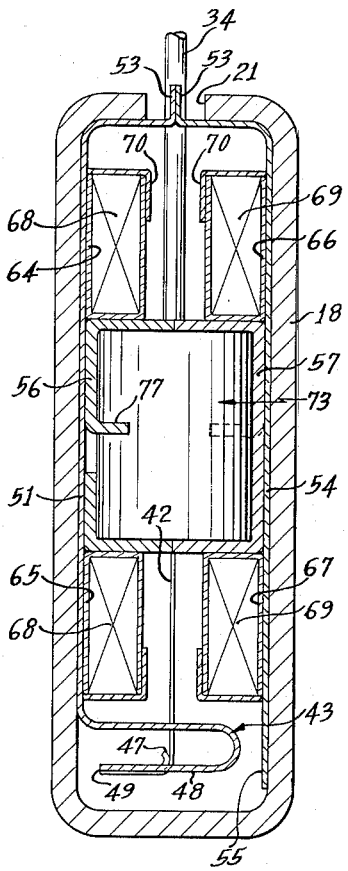
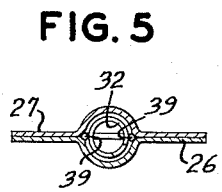
INVENTOR.
EDWARD C. STREETER, JR.
BY
McGregor & Eisenman
ATTORNEY

United States Patent Office 3,211,264
Patented Oct. 12, 1965

3,211,264
ELECTRICALLY CONTROLLED FRICTIONLESS
SLAT-TYPE SCREEN
Edward C. Streeter, Jr., 12 W. 83rd St., New York, N.Y.
Filed June 22, 1962, Ser. No. 204,556
11 Claims. (Cl. 189—62)

This invention concerns an electrically controlled frictionless slat-type screen that is suitable for permanent location in a hermetically sealed air space between two transparent plates.

Adjustable sun screens are well known wherein a plurality of elongated louvers are jointly turnable about parallel transversely spaced coplanar axes. The louvers are disposed either horizontally or vertically in a vertical plane either indoors or outdoors and are positioned manually or by an electric motor, which may be remotely controlled. Since the louvers are turned as a group and held mechanically at a desired angle, friction and wear is unavoidable in the necessary linkages, gears and bearings.

Screens of this type have been placed in the air space between two plates of glass. However, the utility of adjustable between-glass screens has been limited by the need and difficulty of maintenance, the inconvenience of manual control, and the obstruction to vision.

The new screen comprises a plurality of ribbon-like louvers independently turnable about parallel transversely spaced axes and subject to individual restoring torques tending to maintain the louvers at a common angle of repose. The restoring torques are exerted by taut strip suspensions that resiliently tension the louvers longitudinally while permitting frictionless turning thereof. The louvers are adjusted individually in unison by balancing the restoring torques against controlling torques that are exerted by a remote controlled field of force, for example, a magnetic field acting on permanent magnet rotors attached to the ends of the louvers.

The outstanding characteristic of the screen is that the amount of light and radiant heat transmitted therethrough may be instantly altered at the touch of a switch or under automatic control with the consumption of insignificant electrical power.

The screen reduces the solar heat gain to about 60 percent of the gain through a window of single regular plate glass having a Venetian blind on the room side. Furthermore, the closed screen reduces the heat transmission coefficient to between 70 and 40 percent of the coefficient for conventional dual-glazed units dependent upon the surface finish of the louvers.

The screen can be permanently hermetically sealed in the air space of a dual-glazed window because it has no parts that will wear out. The enclosed location prevents dust and films of soot or moisture from impairing the thermal insulating properties or appearance of the screen. The louvers are protected from air currents and physical damage; consequently they can be extremely thin and require no intermediate supports. This results in extraordinarily unobstructed vision through an open screen, far exceeding that of any previous horizontal slat-type screen.

The screen with horizontally disposed louvers eliminates sky glare and improves upon the daylighting provided by an ordinary window.

The electrical operation of the screen permits control either by the occupant of the space adjacent the window or by a master control that prescribes a uniform appearance for all windows on the same side of a building. A combination of controls is preferable. The screens in an office building can be closed at night and open in the morning by a time clock. When the sun is shining, a servo mechanism determines the proper angle of the louvers for complete sun shading and yet optimum daylighting. If the sun is obscured, the screens are adjusted to maintain room illumination as nearly constant as possible. On the other hand, animal houses that are provided with the screens can employ a thermostat and adjust the louvers to retain solar heat gain in winter while preventing excessive temperature fluctuations.

The construction of the screen avoids all machining and employs only stamping, drawing, forming and welding operations that permits rapid manufacture. The ultimate cost of a dual-glazed window containing the new screen is less than the ultimate cost of a window with a single sheet of glass and a Venetian blind over a wide range of air-conditioning equipment, air temperature and solar radiation design conditions.

In order that the screen may be more fully understood, it will now be described in detail with reference to the accompanying drawings wherein:

FIG. 1 is a front elevation of a dual-glazed window unit containing the new screen, with portions broken away to reveal the internal construction, FIG. 2 is a side elevational cross-section brake taken along dashed lines 2—2 of FIG. 1, FIG. 3 is a side elevational cross-section of a portion of the screen on an enlarged scale taken along dashed lines 3—3 of FIG. 1, FIG. 4 is a side elevational cross-section corresponding to a portion of FIG. 2 on an enlarged scale, and FIG. 5 is a cross-section of a resilient louver end fitting taken along dashed lines 5—5 of FIG. 3.

Referring now to the drawings, a magnetic-field operated slat-type screen 11 is shown hermetically sealed in an air space 12 between two glass plates 13 and 14. The glass plates are separated by a lead alloy spacer 15 that is attached in a known manner to metallic coatings on the periphery of the inner surfaces of the glass by solder fillets 16. A rectangular sheet aluminum cover 17 protects the edges of the glass plates 13 and 14 and frames the transparent area of the screen 11.

A rectangular screen frame is provided by a pair of parallel beams 18, 18' held apart at their ends by square tubular steel columns 19. The beams 18, 18' are formed from annealed low carbon steel into a rectangular tubular cross section having a longitudinal slot 21, 21' in the side that faces the air space 12. Ribbon-like aluminum foil louvers 22 are supported under resilient longitudinal tension by the beams 18, 18' in a manner permitting frictionless rotation about parallel transversely spaced coplanar axes. The spacing between adjacent axes of rotation is made sufficiently less than the width of the louvers to cause the louvers to overlap slightly in their closed position. Each transverse edge of the screen is sealed against heat and light leakage by a stainless steel fin 23 that is provided with a flange 24 welded to the side of the column 19 that faces the air space 12. The fin 23 extends in the central plane of the screen and overlaps the last louver 22' along its entire length when it is in its closed position.

One end of each louver 22 is secured to a respective resilient end fitting 25. The resilient end fitting 25 accommodates the thermal expansion and contraction of the louver 22 as well as the unavoidable manufacturing tolerance and operational variation in the spacing between the beams 18, 18'. The fitting 25 comprises a pair of rectangular thin aluminum sheets 26 and 27 joined by a fold 28 adjacent the beam 18. Sheets 26 and 27 have semi-cylindrical grooves 29 and 31, respectively, extending from the fold 28 along the entire longitudinal axis of the fitting 25. The concave surfaces of the grooves 29 and 31 face each other to provide a guiding tube for a helical compression spring 32. A hole 33 is located at the center of the fold 28 to receive a non-magnetic rotor shaft 34 by which the louver 22 is normally rotated. A round head 35 on the end of the shaft 34 is retained by the fold 28 and prevents axial separation of the shaft 34 and the end fitting 25. At the time of assembly, the angular position of the louver 22 relative to the shaft 34 can be adjusted by the application of sufficient torque between the end fitting 25 and the shaft 34 to overcome the considerable rotational friction therebetween.

Before the fold 28 is formed the metal is expanded slightly around the hole 33 to facilitate folding the grooves. Reentrant indentations 36 and 37 are provided in grooves 29 and 31, respectively, equally spaced from the fold 28 and nearer the free ends of sheets 26 and 27. The tops of the indentations 36 and 37 are level with the juxtaposed surfaces of the sheets 26 and 27 and are joined by a spot weld 38 that holds the sheets in the folded position.

The inner end of the spring 32 abuts the indentations 36 and 37 and the outer end presses against a stirrup 39 in the form of a rectangular loop of wire with ends welded to the end of the louver 22. The sides of the stirrup 39 lie closely adjacent the spring 32 at the seam between the sheets 26 and 27, as seen in FIG. 5. The end of the louver 22 is sandwiched between the sheets 26 and 27 beyond the indentations 36 and 37 and is free to slide axially under resilient tension. Solid compression of the spring 32 limits the axial extension of the louver 22 relative to the end fitting 25.

The shaft 34 extends with ample radial clearance through the slot 21 and terminates in the interior of the beam 18 in a flat circular head 41. The shaft head 41 is supported by the lower half of a taut strip suspension that provides frictionless rotation for each end of the louver 22, subject only to a restoring torque.

The lower half of the taut strip suspension comprises a torsion strip 42 in the form of a fine ribbon of beryllium copper wire that is connected between the shaft head 41 and a shock absorbing cantilever spring 43. Each spring 43 is part of a thin sheet of beryllium copper containing similar springs separated by slots 44. The spring 43 is folded back upon itself, forming two-thirds of an S-shape to provide adequate flexibility and to minimize lateral movement of the torsion strip 42 with spring flexure. The spring 43 contains a slot 45 that bifurcates the folded portion extending beyond the longitudinal center line of the beam 18. One end of the torsion strip 42 is secured between a tangent pin 46 and the shaft head 41 to which it is welded. The pin 46 is fixed tangent to a plane passing through the rotational axis of the shaft 34. The torsion strip 42 makes a quarter turn around the tangent side of the pin 46 and extends between the slot 45 in the spring 43 and around an inwardly projecting arcuate tongue 47 on the outer fold 48 of the spring before being fastened near the free end 49 of the spring. The effective length of the torsion strip is determined by the distance between the points of tangency with pin 46 and tongue 47.

Ultrasonic welding is particularly suitable for fastening the ends of the torsion strip because this technique produces uniformly sound metallurgical bonds of high efficiency without fusion or appreciable thickness deformation. It is to be observed that the bonds are subject to shear stress only.

The base of the cantilever spring 43 is integral with a shell 51 that is resiliently pressed against a side of the beam 18. The shell 51 conforms to the right angle bend of the beam 18 adjacent the slot 21, whereby the force on the spring 43 is transferred to the inner edge of the beam 18. The shell 51 extends to the central plane of the screen where it is cut away to form half of circular holes 52 concentric with shafts 34. In the space between shafts 34, the shell 51 is provided with tabs 53 that extend in the central plane of the screen through the slot 21 and project slightly above the surface of the beam 18.

A second shell 54 is provided with an inner end similar to shell 51 and an outer end terminating in a plain edge 55 that extends sufficiently to provide some protection for the springs 43 during assembling operations. Shells 51 and 54 are welded together at tabs 53 to form a housing from which the shafts 34 project at the inner end and the springs 43 appear at the outer end. The second shell 54 is slightly bowed to press shell 51 resiliently against the side of the beam 18.

Aluminum channel members 56 and 57 are attached by their webs to the flat internal faces of shells 51 and 54, respectively, with their longitudinal axes parallel. The flanges of channel members 56 and 57 meet in the plane of the screen and predetermine the spacing of the shells as well as stiffen them. The flanges of the channel members are cut away around the shafts 34 and torsion strips 42 to provide circular clearance holes 58 and 59, respectively.

The other end of each louver 22 is welded between the two halves of a plain end fitting 61 that differs from resilient end fitting primarily by the omission of the helical spring 32 and the stirrup 39. Accordingly, the length of the end fitting 61 is much shorter than end fitting 25 and the indentations 36 and 37 are unnecessary. A louver shaft 62 extends from the end fitting 61 into the interior of beam 18' and terminates in a flat circular head 63. The shaft 62 corresponds to the shaft 34 but is appreciably shorter and has a head 63 of greater diameter that is supported by the upper half of the taut strip suspension.

The upper half of the taut strip suspension is substantially identical to the lower half previously described. Accordingly, corresponding parts are indicated by the same reference numerals with the addition of a prime. However, the channel members 56' and 57' are fastened closer to slot 21' and the torsion strip 42' is substantially twice as long as torsion strip 42.

The controlling torques for turning the louvers 22 against the restoring torques of the taut strip suspensions are exerted by torque motors that will now be described.

Coil retaining channels 64, 65 and 66, 67 of thin sheet aluminum are attached by their webs to the exterior surfaces of the flanges of the channel members 56 and 57, respectively. Channels 64, 65 contain a magnetic field coil 68 that is spirally wound from a ribbon of aluminum foil faced on one side with a ribbon of polyester film. The coil 68 extends the full length of the beam 18 and is wound in place before the channel member 56 is attached to the shell 51. A similar magnetic field coil 69 is contained in channels 66, 67. Tabs 70 on the channels 64–67 are bent over the coils to complete their protection. The aluminum foil wound coils are less expensive and half the weight of equivalent copper wire wound coils. A further advantage is that the thermal coefficient of expansion is the same as the coil retaining channels and the channel members 56 and 57.

It is evident that coils 68 and 69 are positioned to create a laminar magnetic field perpendicular to the plane of the axes of rotation of the louvers 22 through the space defined by the channel members 56 and 57. The beam 18 serves as a return path for the magnetic flux. A magnetic shunt 71 is located at each end of channel members 56 and 57 to short circuit the flux contributed by return bends of the coils 68 and 69.

A diametrically polarized cylindrical permanent magnet rotor 72 is coaxially mounted on the shaft 34 within the channel members 56 and 57. Anisotropic elongated single-domain iron-cobalt permanent magnet material is particularly suitable for the rotor 72. This material, which has recently become commercially available, has excellent magnetic uniformity and high coercive force. It can be die pressed to extremely close dimensional tolerances.

A ring stator 73 coaxially surrounds the rotor 72. The stator 73 comprises a cylindrical tubular magnetic shield 74 covering an aluminum or copper tubular damping element 75 that is separated from the rotor 72 by a radial air gap 76. The outside diameter of the stator 73 is substantially equal to the separation of the axes of the louvers 22 and its length is equal to the inside width of the webs of channel members 56 and 57. The longitudinal position of the stator 73 within the channel members 56 and 57 is determined by tabs 77 projecting from the webs thereof.

Each stator 73 acts as a shield to prevent appreciable magnetic coupling between adjacent rotors 72. The stator provides a uniform return path for the magnetic flux of the rotor at all angles because of the coaxial relationship. However, it is not essential that the static magnetic attraction between the rotor and the stator be uniform at all angles. It is sufficient that the attraction is balanced in diametrically opposite directions. A slight locking torque is not necessarily disadvantageous. For example, a rectangular shielding enclosure may be substituted for the cylindrical tubular shield.

A controlling magnetic field perpendicular to the plane of the screen is created by supplying direct current to the coils 68 and 69 through terminals 78 hermetically sealed in the spacer 15. Magnetic poles of a polarity and strength dependent upon the direction and amplitude of the current are established at diametrically opposite sides of each stator 73 adjacent the side walls of the beam 18. A torque is exerted on each rotor 72 by the tendency of the permanent magnetic field to align with the controlling magnetic field.

The louvers may repose either in an open position or in the closed position. The permanent magnetic field of the rotor is preferably directed at a predetermined angle between 135 and 170 degrees to the direction of the controlling field when the louvers are in repose. A louver rotation of 150 degrees is readily achieved. It is often advantageous to operate the louvers from a suppressed angle of repose. That is, the louvers are held closed by a slight restoring torque in the absence of controlling current, and a certain minimum current is required before the louvers begin to open.

The screen adequately restrains transient movements of the rotor 72. The damping element 75 provides eddy current damping of oscillations about the axis of rotation. Radial movement of the rotor 72 in response to mechanical shock is limited by contact of the shaft 34 with the sides of holes 58 and 59. The shock absorbing spring 43 bends sufficiently in response to axial acceleration of the rotor 72 to permit contact between the inner end of the rotor 72 and the flanges of the channel members 56 and 57 before the torsion strip 42 is overstressed. Torsion strip 42' is protected in a similar manner.

The louvers may be disposed horizontally rather than vertically as illustrated. In the majority of windows, the sag of horizontally disposed louvers is imperceptible. The thickness of a louver rarely needs to exceed a hundredth of its width to provide adequate torsional rigidity. However, louvers having extremely long spans may be driven from both ends, and the louvers can then be exceptionally thin because they do not require any torsional rigidity.

An electric field of force rather than magnetic field may be provided to exert the controlling torques on the louvers as disclosed in United States patent application 81,553 filed Jan. 9, 1961, now U.S. Patent No. 3,211,264. The louvers themselves serve as torque coupling rotors when the screen is operated by an electric field, and the permanent magnet rotors 72 and control field coils 68 and 69 are unnecessary. For this mode of operation, a control electrode at ground potential is provided in the form of either a transparent electrically conductive coating on the outside surface of at least one of the glass plates or wires embedded in the glass. The electric field is created by connecting the screen frame to a source of direct or alternating potential.

I claim:

1. An electrically adjustable screen comprising a plurality of louvers turnable about parallel transversely spaced longitudinal axes from a predetermined angle of repose, a separate rotor attached to each louver and permanently magnetized substantially perpendicularly to its axis, and common coil means spaced from and out of mechanical contact with said rotors for producing an adjustable magnetic field substantially perpendicular to said axes for exerting a torque on said rotors to hold said louvers at an angle adjustable according to the strength of said adjustable field.

2. An electrically adjustable screen according to claim 1, further comprising torsional suspensions including torsional and axial resilient means for supporting the louvers under axial tension and for exerting a restoring torque thereon tending to maintain said louvers at the predetermined angle of repose.

3. An electrically adjustable screen according to claim 2, wherein the torsional suspensions include resiliently tensioned torsion strips, and further including shafts and louver end fittings for connecting the louvers to said torsion strips, each end fitting being rotatable relative to its respective shaft against a frictional torque in excess of the maximum controlling torque for adjusting the position of repose of said louvers.

4. An electrically adjustable screen comprising a plurality of louvers having transversely spaced coplanar axes, a plurality of torsional elements to resiliently exert restoring torques tending to maintain the louvers at a common angle of repose, a plurality of first and second axially resilient means in series with said respective torsional elements to impart tension to the respective louvers, and screen adjusting means for turning the louvers about their axes comprising a plurality of rotors, one rotor attached to each louver between said first and second resilient means and permanently magnetized at a predetermined angle with reference to the plane of its corresponding louver, and a control coil adjacent said rotors and out of mechanical contact therewith for producing a magnetic field component of adjustable intensity interacting with the permanent magnetic fields to exert a controlling torque on each rotor tending to hold said louvers at an adjustable angle from said common angle of repose.

5. A screen according to claim 4 wherein the louver supporting means further comprises a magnetically permeable beam that contains the rotors and the control coil and serves as a partial return path for the magnetic flux.

6. A screen according to claim 4 wherein the control coil has its turns parallel with the plane of the screen and extending beyond all of the rotors disposed on one side of the screen.

7. A screen according to claim 6, further including magnetically permeable shunts positioned between the return bends of the coils and the rotors to shield said rotors from the field contributed by said return bends.

8. An electrically adjustable screen comprising a plurality of louver assemblies independently turnable about transversely spaced longitudinal axes, end supensions for each louver assembly including torsional resilient means adjacent each end and axial resilient means adjacent at least one end for tensioning said assemblies longitudinally and tending to maintain said louver assemblies at a common angle of repose, a torque coupling rotor forming a portion of each louver assembly between the end suspensions of each louver assembly, and louver adjusting means spaced from and out of mechanical contact with said rotors for producing a field of force simultaneously exerting controlling torques on said rotors to hold said louver assemblies at a substantially common angle adjustable according to the strength of said field.

9. An electrically adjustable screen comprising a plurality of louver assemblies having elongated metallic louvers independently turnable about parallel transversely spaced longitudinal axes, a pair of radiation transmitting plates parallel to the plane of said axes and separating said louvers from the ambient atmosphere, end suspensions at each end of each louver assembly including axial and torsional resilient means for tensioning said louvers longitudinally and exerting restoring torques thereon tending to maintain them at a common angle of repose, a portion of each louver assembly serving as a torque coupling rotor disposed between the end suspensions of each louver assembly, and louver adjusting means spaced from and out of mechanical contact with said rotors for producing an adjustable component of a field of force perpendicular to said axes in response to a control potential for simultaneously exerting a controlling torque on each rotor to hold said louvers at a desired angle according to the strength of said field.

10. A screen according to claim 9 wherein the torque coupling rotor is attached at one end of each louver and the louver adjusting means produces a magnetic field interacting with said rotors to exert respective controlling torques.

11. A screen according to claim 10 wherein the torque coupling rotor is a diametrically permanently magnetized rotor.

References Cited by the Examiner
UNITED STATES PATENTS

| | | | |
|---|---|---|---|
| 2,303,442 | 12/42 | Draper | 317—177 |
| 2,520,273 | 8/50 | Bopp et al. | 20—62 X |
| 2,804,923 | 9/57 | Odom | 20—62 X |
| 2,854,071 | 9/58 | Toti | 160—176 |
| 2,905,871 | 9/59 | Martin | 317—171 X |
| 2,953,723 | 9/60 | Flanagan | 317—177 X |
| 3,008,070 | 11/61 | Nemeth | 317—171 X |
| 3,022,549 | 2/62 | Cummings | 20—56.5 |
| 3,129,471 | 4/64 | Johnson et al. | 20—62 X |

HARRISON R. MOSELEY, *Primary Examiner.*